United States Patent [19]

Ingram et al.

[11] Patent Number: 5,512,100
[45] Date of Patent: Apr. 30, 1996

[54] POWDER SPRAY BOOTH WITH MULTIPLE FILTER MODULES

[75] Inventors: Gratus Ingram, Parma, Ohio; Reuven I. Meyers, Minneapolis, Minn.; Timothy G. Chambers, Oswego, Ill.

[73] Assignee: Nordson Corporation, Westlake, Ohio

[21] Appl. No.: 292,537

[22] Filed: Aug. 18, 1994

Related U.S. Application Data

[63] Continuation of Ser. No. 18,895, Feb. 17, 1993, abandoned.

[51] Int. Cl.⁶ ............................................... B05C 15/00
[52] U.S. Cl. .................................. 118/309; 118/326
[58] Field of Search .......................... 55/341.5, 341.6, 55/341.7, 344, 356, 422, 472, 481, DIG. 46; 118/309, 326; 454/53

[56] References Cited

U.S. PATENT DOCUMENTS

| | | | |
|---|---|---|---|
| 3,092,479 | 6/1963 | Hedberg | 55/341.5 |
| 3,870,016 | 3/1975 | Schneider . | |
| 3,870,375 | 3/1975 | Duncan et al. . | |
| 4,298,360 | 11/1981 | Poll . | |
| 4,378,728 | 4/1983 | Berkmann | 118/326 |
| 4,409,009 | 10/1983 | Lissy . | |
| 4,471,715 | 9/1984 | Gubler et al. . | |
| 4,498,913 | 2/1985 | Tank et al. | 454/53 |
| 4,545,324 | 10/1985 | Browning . | |
| 4,723,505 | 2/1988 | Wilson et al. . | |
| 4,729,294 | 3/1988 | Osawa et al. . | |
| 4,770,118 | 9/1988 | Vohringer et al. . | |
| 4,898,116 | 2/1990 | Kozos et al. . | |
| 5,063,835 | 11/1991 | Rockx . | |
| 5,078,084 | 1/1992 | Shutic et al. . | |
| 5,095,811 | 3/1992 | Shutic et al. . | |
| 5,107,756 | 4/1992 | Diaz . | |

Primary Examiner—Matthew O. Savage
Attorney, Agent, or Firm—Holland & Knight

[57] ABSTRACT

A powder coating system includes a powder spray booth having a single fan module which is operatively connected to at least two filter modules, each capable of being moved into position beneath or along side the powder spray booth and then moved out of position in order to permit access to the booth by another filter module. Each filter module contains a number of cartridge filters and a powder collection chamber wherein oversprayed powder removed from the booth interior can be collected for reuse or circulation back to one or more spray guns associated with the booth.

4 Claims, 5 Drawing Sheets

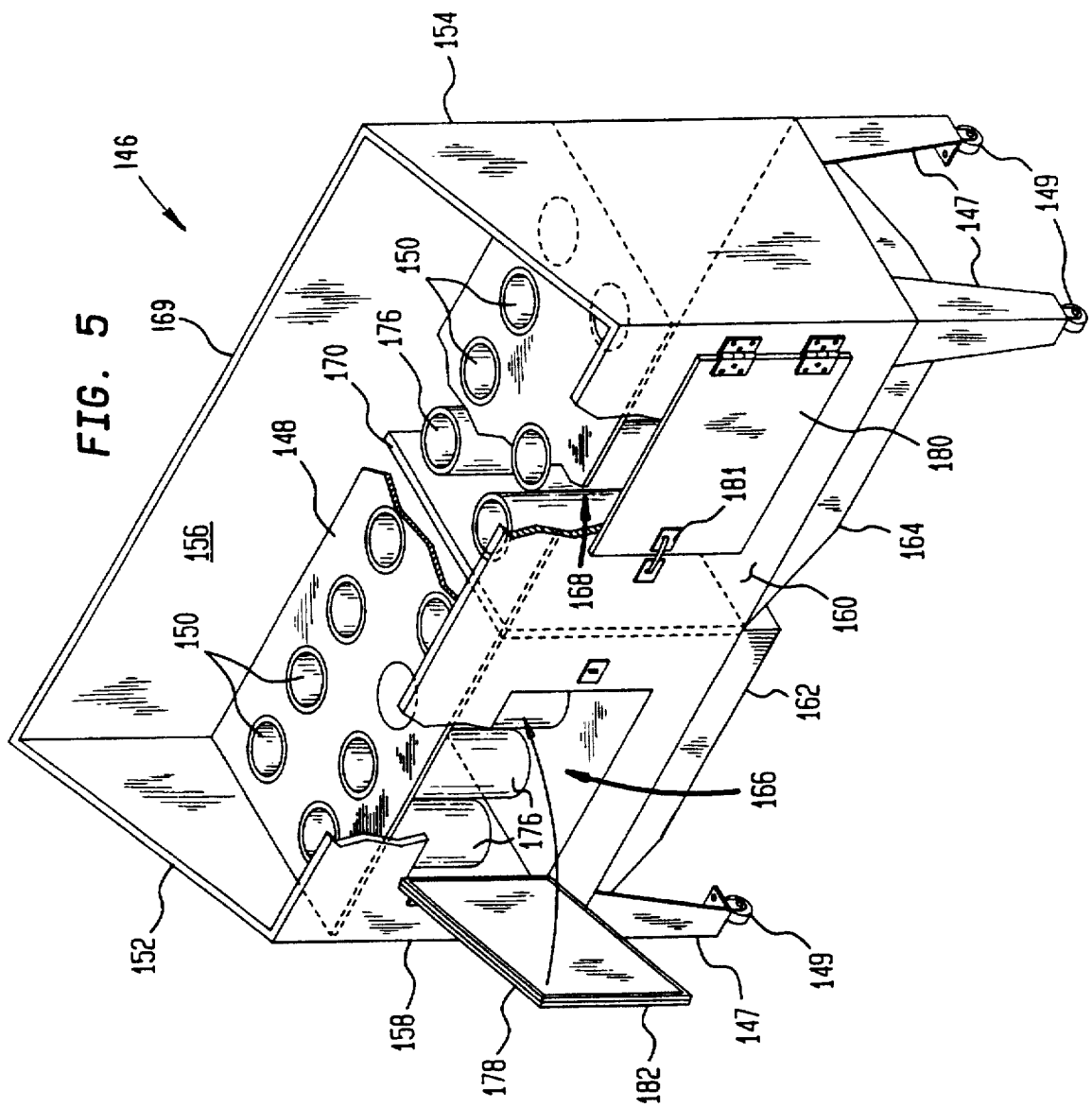

5,512,100

POWDER SPRAY BOOTH WITH MULTIPLE FILTER MODULES

This is a continuation of application Ser. No. 08/018,895, filed Feb. 17, 1993, now abandoned.

FIELD OF THE INVENTION

This invention relates to powder spray coating, and, more particularly to powder spray booths employing two or more individual filter modules operatively connected to a single exhaust fan module.

BACKGROUND OF THE INVENTION

Powder coating systems are currently widely used to apply a protective coating to a variety of articles. These systems generally comprise a powder spray booth which provides a controlled area for the application of powder material onto articles which are transmitted through the booth on a conveyor past one or more automatically manipulated or manually operated powder spray guns. In most systems of this type, an electrostatic charge is applied to the powder coating by the spray guns, with the articles to be coated being held at opposite or ground potential, to enhance the quantity of powder which attaches to the articles and to assist in retaining the powder on the articles. After passing through the powder spray booth, the coated articles are then conveyed to an oven wherein the powder is heated so that it melts, and when subsequently cooled, forms a solid continuous coating on the articles.

Although the electrostatic charge applied to the powder coating material enhances its adherence to the articles to be coated, it is not uncommon for up to half of the total powder sprayed to fail to attach to the articles. This unattached or nonadhered powder material is referred to as "overspray" which must be collected and recycled in order to make the powder coating operation economically feasible. Collection of the oversprayed powder material is conventionally achieved by entraining the oversprayed powder in an airstream withdrawn from the powder booth, conveying that powder entrained airstream to a powder recovery system and there separating the powder from the air so that it either can be stored or recirculated back to the spray guns for reuse. One type of powder recovery system employs cartridge filters which communicate with the interior of the booth, and a fan or blower unit which creates a negative pressure within the booth interior so that the air-entrained powder material is drawn to the cartridge filters within a powder recovery chamber where the powder material is separated from the air. The filtered or "clean" air is drawn through the cartridge filters into a clean air chamber from which it then passes through final filters before being returned to atmosphere. The powder collected within the powder recovery chamber is either scrapped, stored or circulated to the spray guns for spraying. Examples of powder recovery systems of this general type are disclosed, for example, in U.S. Pat. No. 4,409,009 to Lissy; U.S. Pat. No. 4,498,913 to Tank, et al.; and U.S. Pat. No. 4,723,505 to Wilson, et al., all of which are owned by the assignee of this invention.

The popularity of powder coating material has brought with it increasing demands on powder booth manufacturers to provide systems which are versatile, economic and efficient. One customer concern which has not been satisfactorily met involves obtaining a uniform air flow within the booth interior, especially in relatively large volume booths. In many spray booths, the powder recovery system includes a single exhaust fan module connected to a single filter unit or module. Depending upon the location of the exhaust fan and filter unit relative to the powder spray guns, the efficiency of collection of the oversprayed powder may be less than desired because the flow of air within the booth may not be uniform from the inlet end to the outlet end of the booth. For example, many powder spray booth employ groups of spray guns located at different positions therealong which are manually or automatically operated to obtain complete coverage of articles passing through the booth. If the fan module and filter module are located in the center or at one of the ends of the booth, recovery of oversprayed powder from those areas of the booth furthest from the fan module and/or filter unit may not be as efficient as desired and/or as efficient as the area directly beneath the fan. Further, the fan module may not provide an even flow of air throughout the length of the booth which, in turn, adversely affects the transfer efficiency of the powder material, i.e., the effectiveness with which the spray guns apply the powder material onto articles passing through the booth. While this problem can be addressed to some extent by providing a number of separate fan modules and associated filter units at intervals along the length of the booth, such a solution is expensive both in terms of initial investment and maintenance of the system.

Another concern of end users of powder spray booths is to be able to rapidly change from one color of coating material to another with a minimum of downtime. In changing from one color of powder coating material to another, the interior of the spray booth must be completely cleaned of the old color powder material before powder material of a different color can be employed or "speckling" will occur on the new parts to be coated wherein the old and new colors are intermixed. Although some production coating applications require the use of a single color for long periods of time, many smaller volume operations and customers producing customized articles have a need for frequent color changes on a daily basis. Moreover, the economics of such smaller volume operations require that the different colored coating materials be collected for reuse rather than being thrown away as scrap.

This problem has been addressed to some extent in the powder spray booth systems disclosed in U.S. Pat. Nos. 4,498,913 and 4,723,505 mentioned above. In systems of this type, self-contained, cartridge filtering units are moved into position with respect to the interior of a spray booth in preparation for a coating operation involving one color of coating material, and then the filter units are subsequently removed from the booth when the spraying operation for that color is terminated. In order to resume spraying with a new color, the interior of the spray booth is cleaned and a new filter module is moved into position at the spray booth and connected with a fan module permanently associated with the booth.

While systems of this type provide for increased efficiency in effecting a change from one color of coating material to another, they nevertheless require the customer to inventory a separate filter module for each color to be utilized. If a particular business routinely uses many different colors for a particular type or group of articles, the expense of purchasing a large number of separate filter modules, and providing the space to store them, can be prohibitive.

SUMMARY OF THE INVENTION

It is therefore among the objectives of this invention to provide a powder coating system which provides for substantially uniform air flow within the booth interior, which efficiently collects powder throughout the length of the powder spray booth, which permits rapid, efficient and relatively economical color change capability and which is versatile in operation.

These objectives are accomplished in a powder coating system including a powder spray booth having a single fan module which is operatively connected to at least two filter modules, each capable of being moved into position beneath or along side the powder spray booth and then moved out of position in order to permit access to the booth by another filter module. Each filter module contains a number of cartridge filters and a powder collection chamber wherein oversprayed powder removed from the booth interior can be collected for reuse or circulation back to one or more spray guns associated with the powder spray booth.

One aspect of this invention is predicated upon the concept of employing a number of individual filter modules which can be moved in and out of engagement with a powder spray booth, and, when in engagement with the booth, are operatively connected to a single fan module. This is accomplished in one embodiment of this invention in which a fan module is permanently affixed beneath the interior of a powder spray booth, preferably in a central location with respect to the inlet and outlet ends of the booth. The fan module includes a motor driven fan or blower connected to a common duct having opposed ends. A first filter module is moved into position on one side of the fan module and a second filter module is moved into position on the opposite side of the fan module such that the opposite ends of the common duct of the fan module are each connected to one of filter modules. The fan module is operative to create a suction within the common duct which, in turn, draws air-entrained powder material from the interior of the booth through each of the filter modules. The oversprayed powder is collected within a powder collection chamber associated with each filter module where it can be stored or recirculated back to the spray guns associated with the powder spray booth.

One advantage of this construction is that a single fan module accommodates at least two, individual filter modules which can be independently moved in and out of engagement with the powder spray booth in order to effect a rapid change from powder coating material of one color to another. Additionally, because a suction is applied by the fan module through each of at least two filter modules, a more evenly distributed downward flow of air-entrained powder material is achieved within the interior of the powder spray booth. Instead of the suction being generated from a single location, as in many prior powder spray booths, a negative pressure is created by the fan module in at least two locations along the length of the booth where the filter modules are located. Advantageously, each filter module can be positioned directly beneath a bank or grouping of powder spray guns to efficiently remove oversprayed powder material at the areas closest to where it is generated. Further, this system is compact in construction. The filter modules and fan modules are all located beneath the booth, which permits other equipment to be located close to the powder spray booth without interference.

An alternative embodiment of the above-described construction contemplates the use of a single fan module with two separate powder spray booths. In this embodiment, two booths are aligned side-by-side with a fan module located therebetween, i.e. spanning the two booths. One filter module is moved into position with respect to the first spray booth, while a second filter module is moved into position at the second spray booth. The first and second filter modules are connected to the common duct of the fan module, so that one filter module in each booth is operated by the same fan module. This construction is particularly advantageous in applications where rapid color changes are desired. Either one of the two filter modules can be quickly moved away from its associated spray booth, and then replaced by another filter module, without creating contamination of the filter module in the other booth connected to the common fan module.

Each of the above-described embodiments are so-called "downdraft" powder spray booths wherein air-entrained, oversprayed powder material is drawn from the booth's interior downwardly to the floor of the booth where the filter modules and fan module are located. Another type of powder spray booth in common commercial use is a "side draft" booth wherein the air-entrained, oversprayed powder material is drawn toward the side of the booth instead of its floor.

In the embodiment of this invention particularly intended for side draft booths, a fan module is mounted in an essentially fixed position with respect to a spray booth having an opening in its sidewall opposite one or more spray guns which apply coating material onto articles passing through the booth. A filtering unit is moved in and out of position with respect to the fan module, and in communication with the opening in the side of the booth. This filtering unit has a top wall, bottom wall, front wall, back wall and opposed ends defining a hollow interior which carries a number of cartridge filters. The interior is separated into two individual compartments, or filter modules, by a partition plate which extends between the front and back walls. The front wall is formed with a first opening leading to one of the filter modules, and a second opening leading to the other filter module. Both of these openings are selectively closed by a separate, leak-proof door. In operation, one of the filter modules of the filtering unit is sealed by the door associated therewith, while the door of the other filter module is opened so that air-entrained, oversprayed powder material can be drawn by the fan module from the interior of the spray booth through the open filter module for collection. When it is desired to spray with a powder material of different color, the door of the filter module which had been in use is sealed closed while the door of the other filter module is opened thus allowing the coating material of different color to be collected in the second filter module without requiring repositioning of the filtering unit or replacement of it with a new filtering unit.

One important advantage of this embodiment of the present invention is that the total number of filter modules which the customer has to maintain in inventory can be reduced. One filtering unit contains two individual filtering modules which can be used in sequence to accommodate two different colored coating materials by simply opening and closing the doors associated with the respective modules. Additionally, both filter modules are connected to a single fan module which further reduces costs and conserves space in the area surrounding the powder spray booth.

DESCRIPTION OF THE DRAWINGS

The structure, operation and advantages of the presently preferred embodiment of this invention will become further apparent upon consideration of the following description, taken in conjunction with the accompanying drawings, wherein:

FIG. 5 is a side view of the filtering unit associated with the powder spray booth of FIG. 4.

DESCRIPTION OF THE INVENTION

Figure 1:
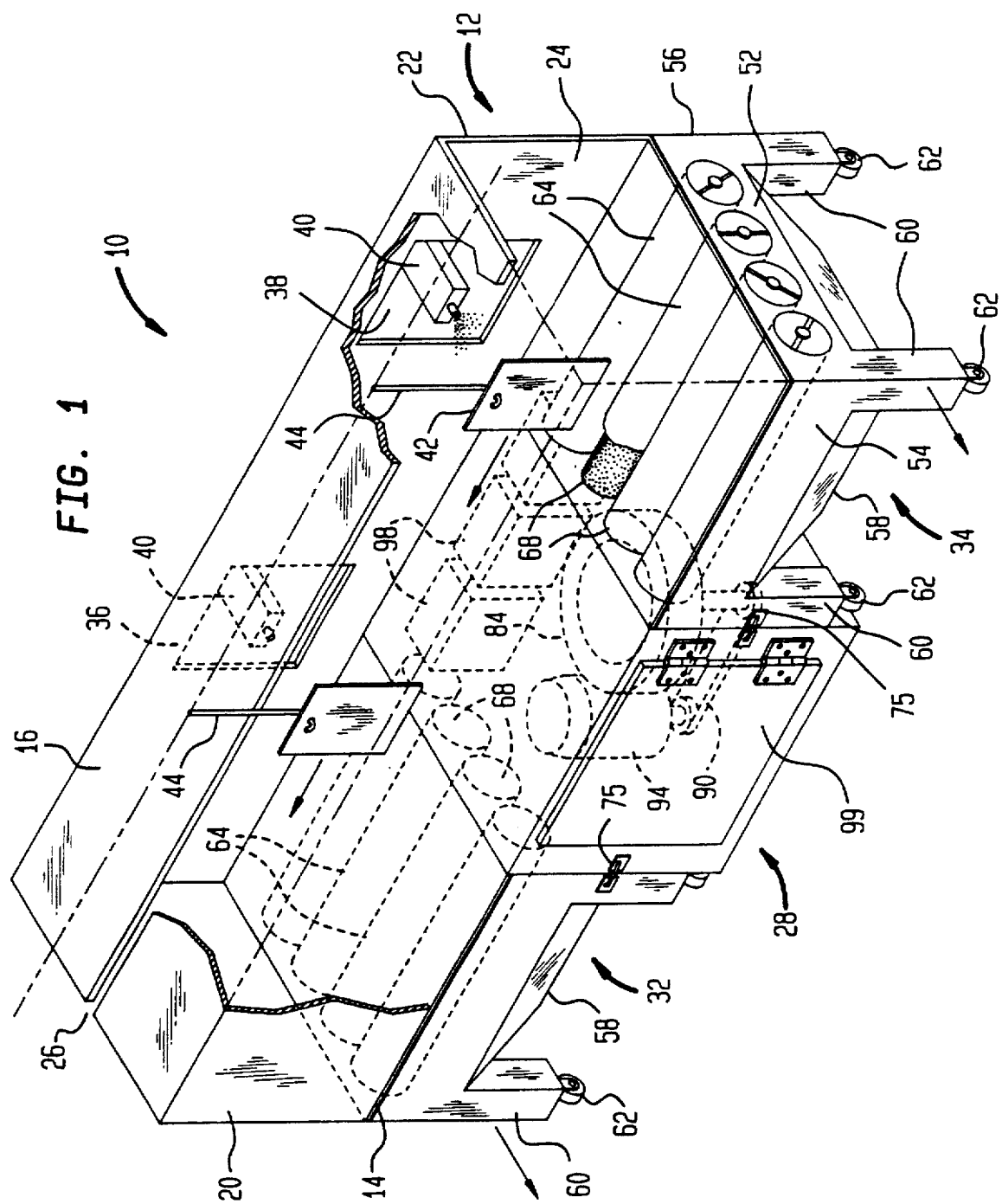
FIG. 1 is a perspective view of one embodiment of a downdraft powder spray booth of this invention.
Figure 2:
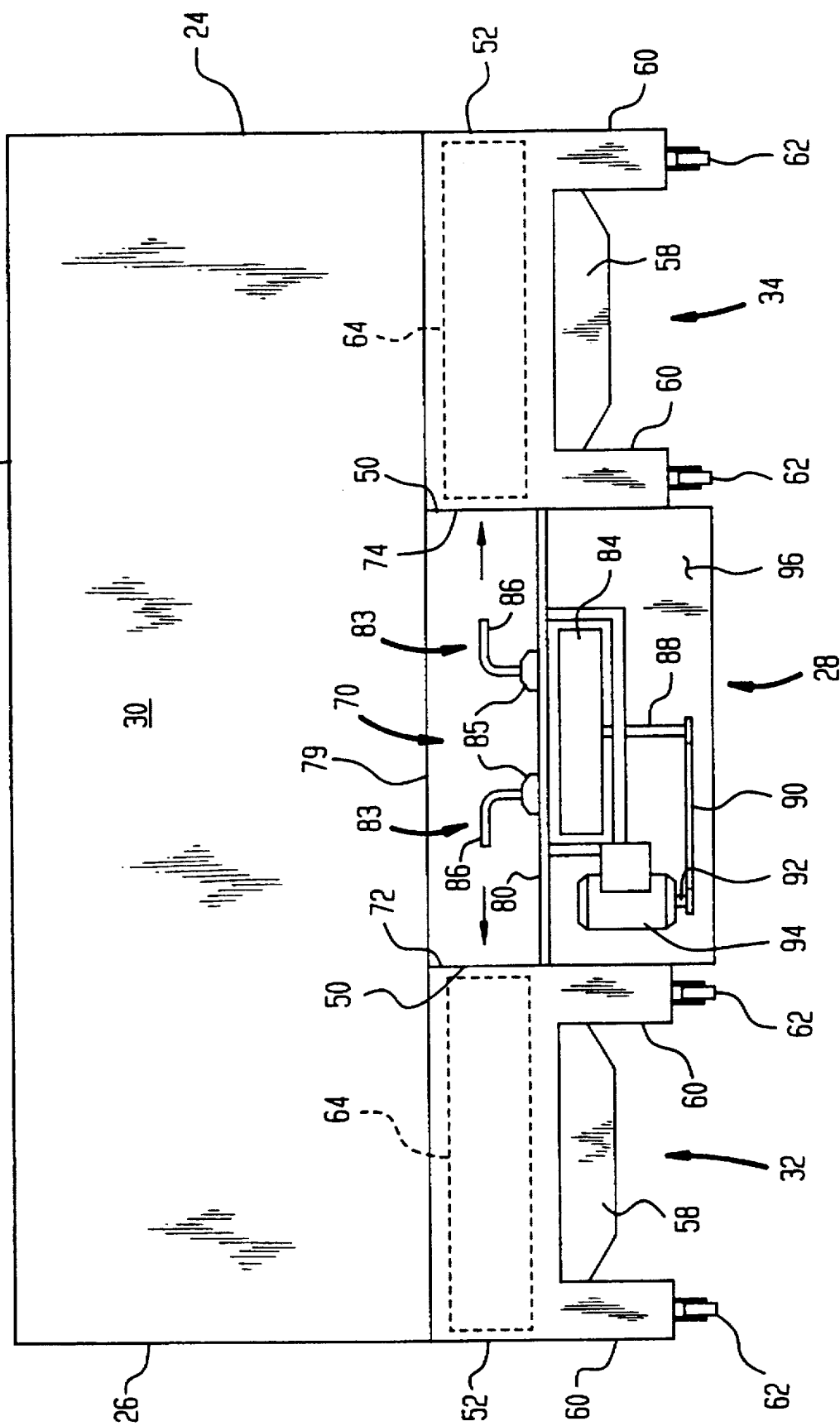
FIG. 2 is a side view of the powder spray booth shown in FIG. 1.

Referring initially to the embodiment illustrated in FIGS. 1 and 2, a downdraft powder spray booth 10 is depicted which comprises a rectangular booth housing 12 supported on a frame 14. The booth housing 12 includes a top wall 16, a bottom wall 18 extending partially therealong, opposed side walls 20 and 22, an inlet end 24 and an outlet end 26. For purposes of the present illustration, the bottom wall 18 extends atop a fan module 28 carried by the frame 14, and the bottom of the booth housing 12 is otherwise open to the booth interior 30 forming longitudinally spaced outlet openings 19 and 21 for permitting the passage of oversprayed powder, which does not adhere to objects, out of the booth interior, or chamber 30. As described in detail below, filter modules 32 and 34 are movable into position on either side of the fan module 28, in communication with the booth interior 30, and are preferably located generally beneath openings 36 and 38, respectively, in the booth sidewall 20. These openings 36, 38 each receive one or more powder spray guns 40 which are operative to apply electrostatically charged powder coating material onto articles 42 which are conveyed through the booth housing 12 on brackets 44 supported by a conveyor mechanism (not shown).

Each of the filter modules 32 and 34 are preferably of the type disclosed in U.S. Pat. No. 4,723,505 to Wilson, et al., owned by the assignee of this invention, the disclosure of which is incorporated by reference in its entirety herein. A detailed description of the construction of filter modules 32, 34 is disclosed in U.S. Pat. No. 4,723,505 and is not repeated herein. But for purposes of the present discussion, the filter modules 32, 34 each comprise a collector housing having opposed ends 50, 52, opposed sides 54, 56 and a hopper 58 at the bottom thereof. A leg 60 having a caster 62 is mounted at each of the four corners of the collector housing 48 so that the filter modules 32, 34 can be rolled or wheeled into position with respect to the booth housing 12. As noted above, the filter modules 32, 34 are positioned on either side of the fan module 28, and preferably beneath one or more of the spray guns 40 protruding from the openings 36, 38 on the booth sidewall 20.

As described in U.S. Pat. No. 4,723,505, the collector housing 48 of each filter module 32, 34 carries a number of horizontally oriented cartridge filters 64 which are located vertically above the hopper 58. The end wall 50 of the collector housing 48 of each filter module 32, 34 is formed with a number of spaced openings 68 over which one of the cartridge filters 64 is mounted, for purposes to become apparent below.

With reference to FIGS. 1 and 2, the fan module 28 includes a common duct 70 formed by opposed ends 72, 74, opposed side walls 76, 78, a top wall 79 and a bottom wall 80. In the presently preferred embodiment, the end wall 72 of common duct 70 is engageable with the end wall 50 of filter module 32, and the end wall 74 of common duct 70 is engageable with the end wall 50 of filter module 34. The filter modules 32, 34 are secured in position against the fan module 28 by any suitable means such as a latch device 75 shown schematically in FIGS. 1 and 2. Preferably, a gasket (not shown) is interposed between the ends 72, 74 of common duct 70 and the end wall 50 of each filter module 32, 34 to create a seal therebetween. Once in position, the ends 72, 74 of common duct 70 cover the spaced openings 68 in the end walls 50 of filter modules 32, 34 so that the interior of each filter module 32, 34 communicates with the interior of common duct 70. Additionally, a number of reverse air jets 83 are mounted within the common duct 70 atop bottom wall 80. Each of the reverse air jets 84 is formed with a valve 85, and a nozzle 86 positioned in alignment with one of the spaced openings 68 in the filter module end walls 50.

The bottom wall 80 of common duct 70 mounts a radial fan 84 having radial fins which are driven by a shaft 88. The shaft 88 is drivingly connected by a belt 90 to the output shaft 92 of a motor 94. The radial fan 84 and motor 94 are housed within a clean-air chamber 96 formed in the fan module 28 which, in turn, carries a number of final filters 98 communicating with atmosphere. See FIG. 1. Access to the clean air chamber 96 is obtained via a door 99. As described in more detail below, the radial fan 84 is operative to create a suction or negative pressure within the common duct 70, which, in turn, draws air-entrained, oversprayed powder from the booth interior 30 into the filter modules 32, 34.

In operation, the articles 42 are transmitted through the booth interior 30 past the spray guns 40 located at the booth openings 36 and 38. The powder material is electrostatically charged by the spray guns 40 and deposited onto the articles 42 which are held at ground potential. The radial fan 84 of fan module 28 develops a negative pressure within the common duct 70 which, in turn, creates a suction through each of the cartridge filters 64 in filter modules 32, 34 which are connected to the common duct 70 via the openings 68 in the filter module end walls 50. This creates a downwardly directed air flow within the booth interior 30 within which oversprayed powder material is entrained. The air carrying the powder material passes through the cartridge filters 64, upon which the oversprayed powder material is collected, and through the common duct 70 into the clean air chamber 96 of fan module 28. Any residual powder contained within that air flow is filtered by the final filters 98 within clean air chamber 96 and the "clean" or filtered air is discharged to atmosphere. From time-to-time, the fan 84 is operated to create a reverse, pulsed air flow within air jets 83 which dislodges filtered powder material from the cartridge filters 64 so that it is collected with the remaining oversprayed powder in the hoppers 58 of filter modules 32, 34.

One important advantage of the construction of powder spray booth 10 is that two filter modules 32 and 34 are employed on either side of the fan module 28 and can be rolled in and out of position with respect to the fan module 28, and the booth interior 30, quickly and efficiently. This is advantageous when it is desired to convert from a powder material of one color to another color because the filter modules 32, 34 can be quickly removed and replaced with clean filter modules, while the booth interior 30 is wiped clean of the old color of powder material, thus greatly reducing the time required to complete a color change operation. Additionally, because each filter module 32, 34 is preferably located beneath one of the openings 36, 38 in the booth housing 12 which mount powder spray guns 40, collection of oversprayed powder material is accomplished more efficiently since oversprayed powder material is drawn essentially directly downwardly into the filter module 32 or 34 beneath each one or group of spray guns 40. Further, because there are two filter modules 32, 34, a more evenly distributed downward air flow is obtained within the booth interior 30. This enhances "transfer efficiency", or the effectiveness with which the powder material is applied onto the articles 42.

Figure 3:
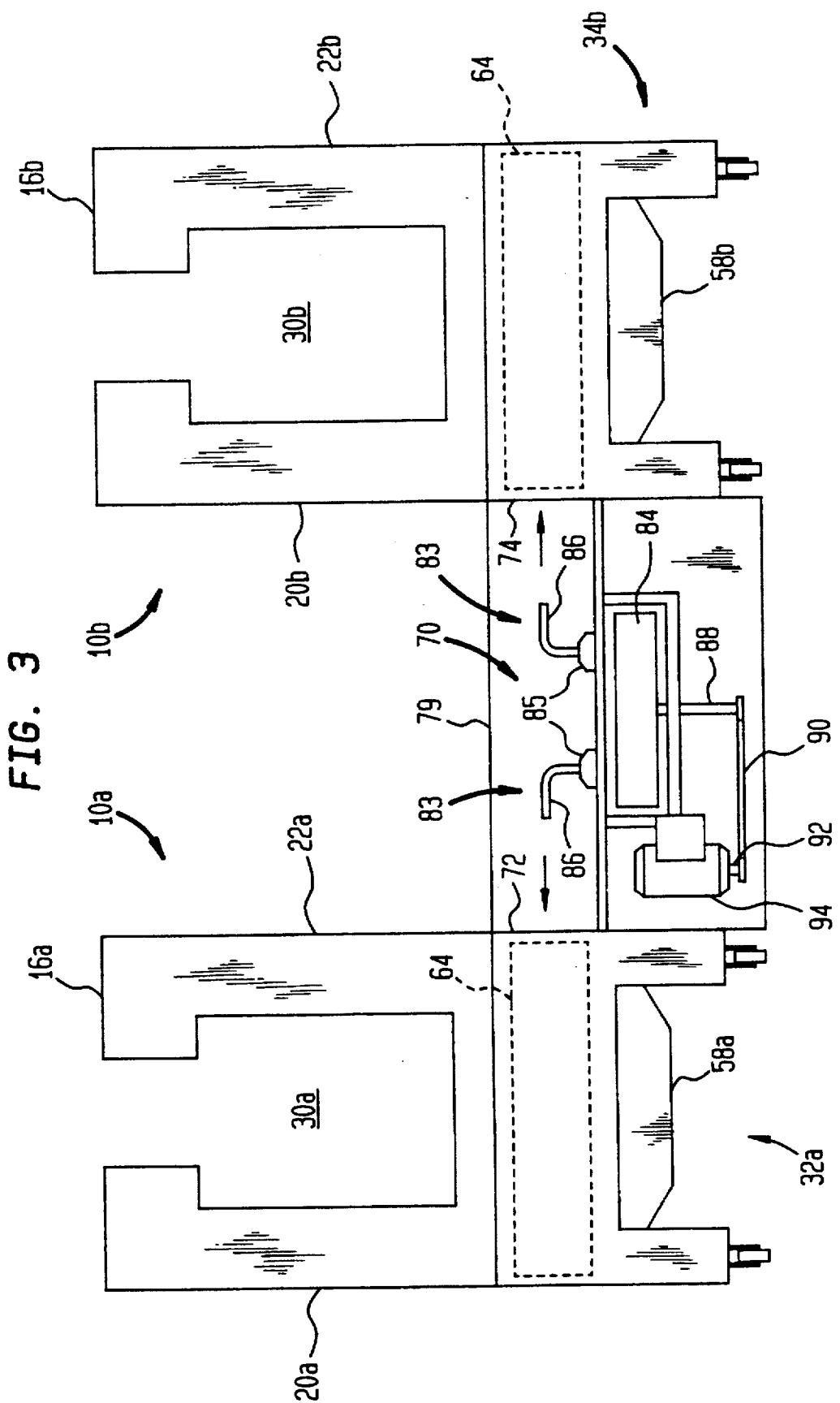
FIG. 3 is an end view of an alternative embodiment of this invention wherein a single fan module is employed with a filter module in each of two side-by-side booths.

An alternative embodiment of FIGS. 1 and 2 is illustrated in FIG. 3 wherein a pair of powder spray booths 10A and 10B are positioned side-by-side with a common fan module 28 extending therebetween. The fan module 28 is connected to a filter module 32A of booth 10A, and to a second filter module 34B associated with the powder spray booth 10B. The fan module 28 and filter modules 32A, 34B are identical to the fan module 28 and filter module 32, 34, respectively, described above in connection with the embodiment of FIGS. 1 and 2 and the same reference numbers are used to depict common structure with the addition of the letters "A" or "B". If desired, a second fan module 28 and associated filter modules 32A, 32B, (not shown) can be positioned at another location along each of the powder spray booths 10A and 10B in generally the same location as the filter modules 32 and 34 of booth 10.

The overall concept of the embodiment of FIG. 3 is the same as that of FIGS. 1 and 2. A single fan module 28 is employed with two filter modules 32A and 34B to obtain a construction which is compact, versatile and efficiently collects oversprayed powder material. The additional advantage provided by the FIG. 3 embodiment is that the filter modules 32A and 34B can be rolled in and out of an engagement with their respective spray booths 10A and 10B, and connected to the common fan module 28, independently of one another at essentially any desired time. This enables different colors to be applied to articles in the two booths 10A and 10B, and allows a color change operation to take place in either booth independently of the other.

Side Draft Booth

Figure 4:
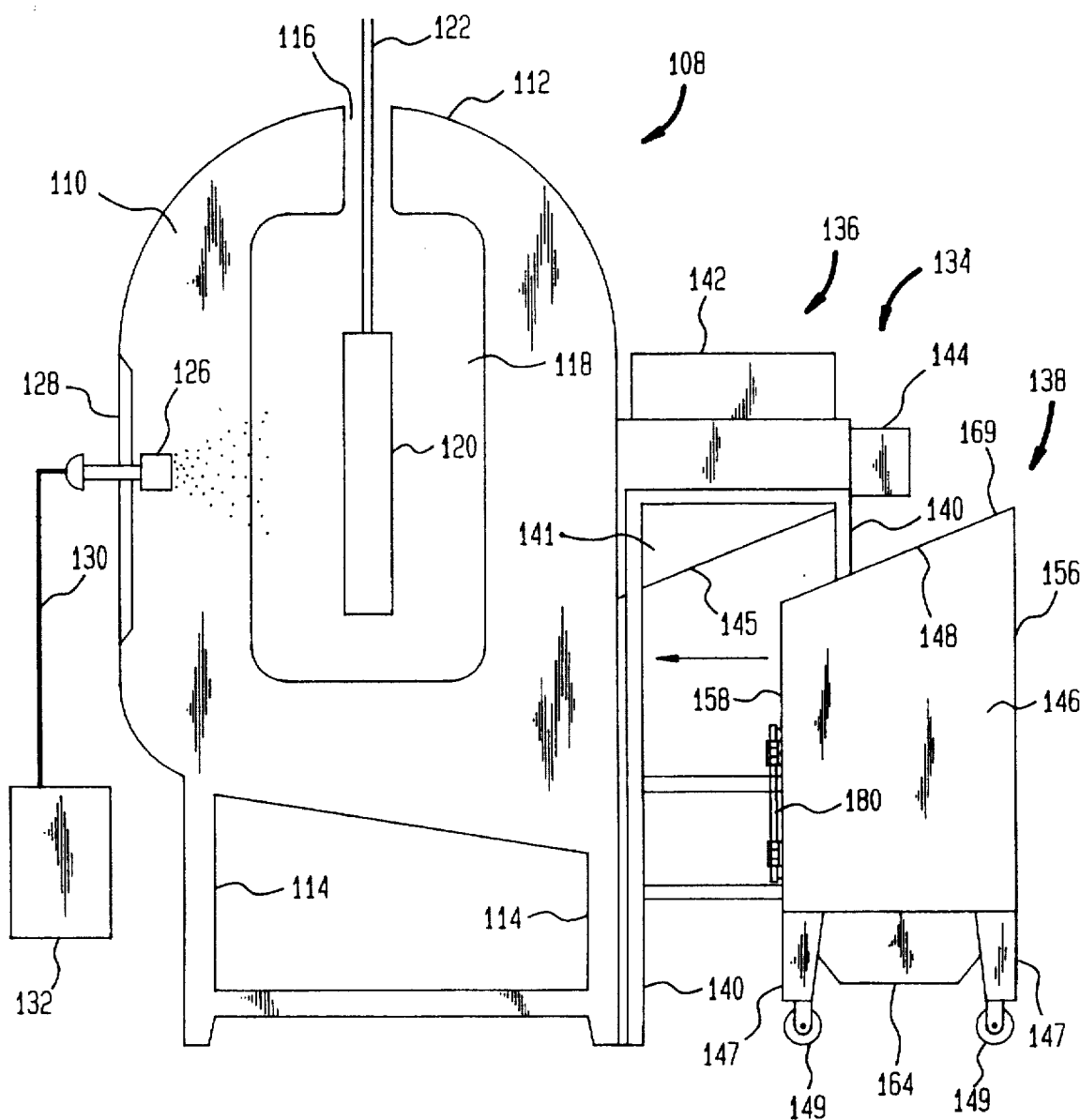
FIG. 4 is a perspective view of a side draft powder spray booth constructed in accordance with the principals of this invention.

Referring now to FIGS. 4 and 5, a side draft powder spray booth 108 is depicted of the type disclosed in U.S. Pat. No. 4,378,728 to Berkmann and U.S. Pat. No. 4,498,913 to Tank, et al., both owned by the assignee of this invention, the disclosures of which are incorporated by reference in their entireties herein. The overall construction of the side draft booth 108 forms no part of this invention of itself, and is thus discussed only briefly herein. Generally, the side draft booth 108 comprises end walls 110, one of which is shown in the drawings, and a top boundary wall 112 supported by vertically oriented feet 114. The upper part of the boundary wall 112 is formed with a slot 116 which extends longitudinally along the length of the booth through its end walls 110. The slot 116 extends downwardly and connects with an opening 118 in the end walls lying opposite one another. Articles 120 are transmitted through the booth 108 on brackets 122 carried by a conveyor (not shown). Powder material is deposited on the articles 120 by one or more spray guns 126 extending through one or more openings 128 in the booth 108. Conventionally, powder material is fed to the spray guns 126 via line 130 connected to a powder feed hopper 132, as described in detail in U.S. Pat. No. 4,378,728.

In order to retrieve oversprayed powder material from the interior of booth 108 a powder recovery unit 134 is provided at the side of booth 108 opposite the spray guns 126. The powder recovery unit 134 is similar to that disclosed in U.S. Pat. No. 4,498,913. It comprises a fan or blower unit 136 and a movable filter unit 138. The blower unit 136 is mounted by vertical supports 140 in a position immediately adjacent the booth 108. The blower unit 136 includes a sheet metal housing 141 which contains a blower (not shown) in an upper housing portion 142 thereof, and a series of final filters 144 shown schematically at the side of the housing 141. Preferably, the housing 141 has a lower edge 145 which lies in a plane inclined at an angle of about 30° with respect to horizontal.

With reference to FIG. 5, the filter unit 138 is formed by a cabinet 146 supported at each corner by vertical legs 147 each having a roller 149. The cabinet 146 comprises a horizontally oriented top wall 148 formed with a number of openings 150, a pair of opposed end walls 152, 154, a back wall 156, a front wall 158 and a bottom wall 160 which forms a pair of powder collection chambers 162 and 164. Preferably, the end walls 152 and 154 are tapered upwardly from the front wall 158 to the vertically higher back wall 156 at an angle of about 30° to horizontal, thus forming an upper edge of the filter unit 138 which is mateable with the angled sheet metal housing 141 of the blower unit 136. A gasket 169 is carried by this upper edge of filter unit 138 to create a seal upon contact with the housing 141 as described in more detail below.

In the presently preferred embodiment, the filter unit 138 is divided into two separate filter modules 166 and 168 by a partition 170 which extends horizontally between the back wall 156 and front wall 158, and vertically between the bottom wall 160 and top wall 148. The front wall 158 of cabinet 146 has an opening 172 into the interior of filter module 166, and a second opening 174 is formed in front wall 158 leading to the interior of second filter module 168. Each of the filter modules 166, 168 include a number of vertically oriented cartridge filters 176, preferably 36 inches in height, which are mounted to the horizontal top wall 148 of cabinet 146 over one of the openings 150 therein.

In the presently preferred embodiment, the filter unit 138 is provided with a pair of doors 178 and 180, each carrying a peripheral gasket 182, which are movable between an opened and closed position with respect to the openings 172 and 174, respectively. When in the closed position, the gasket 182 associated with each door 178, 180 creates a seal along the front wall 158 of cabinet 146 thus sealing the interior of the filter sections 166 or 168 from the interior of booth 108. The doors 178 and 180 are maintained in the closed position by a latch 181, depicted schematically in FIG. 5, or any other suitable closure means.

The operation of the side draft booth depicted in FIGS. 4 and 5 proceeds as follows. Initially, the filter unit 138 is moved on its rollers 149 into position beneath the blower unit 136 such that the gasket 169 along the angled top edge of cabinet 146 contacts and sealingly engages the correspondingly angled sheet metal housing 141 of blower unit 136, and such that the first and second openings 172 and 174 in the front wall 158 of the filter module are sealed to the outlet opening 129 in the sidewall of the spray booth. The units 136 and 138 are clamped together by a hook and lug arrangement (not shown) discussed in U.S. Pat. No. 4,498,913. Once the filter unit 138 is in position beneath the blower unit 136, the openings 150 in the top wall 148 of its cabinet 146 communicate with the blower contained in the upper portion 142 of blower unit 136 so that a suction can be drawn through the cartridge filters 176 within the filter unit 138. This suction or negative pressure, in turn, creates a flow of air directed toward the side of booth 108 opposite spray guns

126 within which oversprayed powder material which does not adhere to the articles 120 is entrained, as discussed in detail in U.S. Pat. Nos. 4,378,728 and 4,498,913.

The construction of the filter unit 138 provides a number of advantages. Because the filter unit 138 is divided into two individual filter modules 166 and 168, a single filter unit 138 can be utilized for two different colors of powder material without changing its position relative to the blower unit 136 and spray booth 108. When applying powder material of one color, one of the doors 178, 180 is closed and sealed over its respective opening 172, 174 in the cabinet 146 thus closing off one of the filter modules 166, 168 from the interior of the booth 108. The filter module 166 or 168 which is opened to the interior of booth 108 thus collects all of the oversprayed powder of such one color. When it is desired to change to a powder material of another color, the unused filter module 166 or 168 is opened to the interior of booth 108 while the other is closed by opening and closing their respective doors 178, 180. As a result, a separate filter unit 138 need not be utilized with each color change and, hence, the total number of filter units 138 which must be inventoried for use with the booth 108 can be reduced by half. It is contemplated that one of the filter modules 166 or 168 could be utilized with the primary color to be applied within the booth 108, whereas the other filter module 166, 168 could be utilized for a color applied only occasionally and discarded as scrap. Alternatively, both filter modules 166, 168 could be utilized for primary colors and the oversprayed powder collected therein could be recirculated and/or saved for reuse. In any event, both of the filter modules 166, 168 are accommodated by a single blower within the blower unit 136 which reduces equipment costs and provides added versatility and flexibility in the overall operation of booth 108.

While the invention has been described with reference to a preferred embodiment, it should be understood by those skilled in the art that various changes may be made and equivalence may be substituted for elements thereof without departing from the scope of the invention. In addition, many modifications may be made to adapt a particular situation or material to the teachings of the invention without departing from the essential scope thereof.

For example, it is contemplated that the powder spray booth 10 illustrated in FIGS. 1–3 would be most commonly utilized with a single color and filter modules 32 and 34 would be exchanged with different modules when a color change was required. Nevertheless, a "dead zone" or transition area could be provided within the booth interior 30 between the filter modules 32 and 34 enabling powder material of different colors to be applied on either end of the booth 10 without cross contamination of the powder collected in either filter module 32 or 34.

Additionally, with reference to FIGS. 4 and 5, while the partition 170 is illustrated as separating the cabinet 146 of filter unit 138 into filter modules 166 and 168 of equal volume, it is contemplated that the partition 170 could be placed at other locations within the interior of cabinet 146 so that the volume of filter modules 166 and 168 would not be identical. For example, one of the filter modules 166 or 168 could occupy two-thirds of the total volume of cabinet 146, while the other would occupy one-third, depending upon the requirements of a particular application and the spraying conditions within the booth 108.

Therefore, it is intended that the invention not be limited to the particular embodiment disclosed as the best mode contemplated for carrying out this invention, but that the invention will include all of the embodiments falling within the scope of the appended claims.

We claim:

1. Apparatus for applying powder coating material onto objects, comprising:
   a powder spray booth including:
   (i) a ceiling, a floor, a pair of opposed side walls and a pair of opposed end walls which collectively define a booth interior in which to powder coat objects;
   (ii) said ceiling being formed with a conveyor slot to permit the transfer of objects longitudinally through said booth interior;
   (iii) one of said opposed side walls having openings at which at least one powder dispensing device is mounted to apply powder coating onto objects within said booth interior; and
   (iv) the other of said opposed side walls being formed with an outlet opening to permit the passage of oversprayed powder, which does not adhere to objects, out of said booth interior;
   a collector tier collecting said oversprayed powder material from said booth interior including:
   (i) a first filter module and a second filter module each including a number of cartridge filters, said first and second filter modules being carried within a single housing having a front wall formed with a first opening into said first filter module and a second opening into said second filter module, first and second doors mounted on said front wall, wherein said first door is movable between an open position and a closed, sealed position relative to said first opening, and wherein said second door is movable between an open position and a closed, sealed position relative to said second opening;
   (ii) said first and second filter modules being movable in and out of communication with said outlet opening, wherein said front wall is positionable adjacent said other of the opposed walls of said booth such that said first and second openings are sealed to said outlet opening;
   (iii) a single blower device common to said first and second filter modules, for drawing air-entrained oversprayed powder coating material from said booth interior into at least one of said first and second filter modules for the collection of said oversprayed powder coating material;
   (iv) wherein said housing includes a top wall, bottom wall, opposed sidewalls, and a back wall, and wherein said first and second filter modules are separated by a divider plate extending between said front and back walls and between said top and bottom walls.

2. The apparatus of claim 1 in which said blower device includes a housing having a first surface mateable with a second surface formed in said single housing containing said first and second filter modules, said first and second surfaces each being formed at an acute angle with respect to said other of said pair of opposed side walls.

3. Apparatus for applying powder coating material onto objects, comprising:
   a powder spray booth including:
   (i) a ceiling, a floor, a pair of opposed side walls and a pair of opposed end walls which collectivity define a booth interior in which to powder coat objects;
   (ii) said ceiling being formed with a conveyor slot to permit the transfer of objects longitudinally through said booth interior;
   (iii) one of said opposed side walls having openings at which at least one powder dispensing device is mounted to apply powder coating onto objects within said booth interior; and (iv) said floor being formed with longitudinally spaced first and second outlet openings to permit the passage of oversprayed powder, which does not adhere to objects, out of said booth interior;

a collector for collecting said oversprayed powder material from said booth interior, including:

(i) a first filter module and a second tiller module each including a number of cartridge filters, said first and second filter modules being separate units movable independently in and out of communication with said booth interior, wherein said first filter module is mountable to said first outlet opening and said second filter module is mountable to said second outlet opening;

(ii) wherein said first filter module is movable in and out of communication with said first outlet opening and said second filter module is movable in and out of communication with said second outlet opening;

(iii) a single blower device, connectable to each of said first and second filter modules, for drawing air-entrained oversprayed powder coating material from said booth interior simultaneously into said first and second filter modules for the collection of said oversprayed powder coating material.

4. The apparatus of claim 3 in which said single blower device is a fan module mounted to said floor of said powder spray booth, said fan module including a common duct connected to each of said first and second filter modules and a fan connected to said common duct.

* * * * *

UNITED STATES PATENT AND TRADEMARK OFFICE
CERTIFICATE OF CORRECTION

PATENT NO. : 5,512,100
DATED : April 30, 1996
INVENTOR(S) : Gratus Ingram et al.

It is certified that error appears in the above-indentified patent and that said Letters Patent is hereby corrected as shown below:

In column 10, line 19, "tier" should read --for--.

In column 10, line 37, "scaled" should read --sealed--.

In column 10, line 42, "tiller" should read --filter--.

In column 11, line 7, "tiller" should read --filter--.

Signed and Sealed this

Tenth Day of December, 1996

Attest:

BRUCE LEHMAN

Attesting Officer

Commissioner of Patents and Trademarks